United States Patent [19]
Satoh

[11] Patent Number: 5,982,981
[45] Date of Patent: Nov. 9, 1999

[54] ELECTRONIC IMAGING APPARATUS

[75] Inventor: Yoshiaki Satoh, Hachiohji, Japan

[73] Assignee: Olympus Optical Co., Ltd., Tokyo, Japan

[21] Appl. No.: 08/738,824

[22] Filed: Oct. 28, 1996

Related U.S. Application Data

[63] Continuation of application No. 08/249,031, May 25, 1994, abandoned.

[30] Foreign Application Priority Data

May 25, 1993 [JP] Japan .................................. 5-145747

[51] Int. Cl.$^6$ .................................................. H04N 5/225
[52] U.S. Cl. ............................................ 386/107; 386/117
[58] Field of Search ................................ 358/906, 909.1; 386/4, 38–39, 45, 52, 54, 55, 57, 63–65, 96–107, 117, 121, 125–126; 348/207, 231–233; 360/18, 27, 69; H04N 5/92, 5/91, 5/225, 6/76, 9/04

[56] References Cited

U.S. PATENT DOCUMENTS

| | | | |
|---|---|---|---|
| 4,777,537 | 10/1988 | Ueno et al. | 358/341 |
| 4,965,675 | 10/1990 | Hori et al. | 358/341 |
| 5,130,812 | 7/1992 | Yamaoka | 358/341 |
| 5,130,813 | 7/1992 | Oie et al. | 358/906 |
| 5,262,877 | 11/1993 | Otsuka | 358/343 |
| 5,333,092 | 7/1994 | Sato et al. | 358/341 |
| 5,335,072 | 8/1994 | Tanaka et al. | 358/906 |
| 5,469,272 | 11/1995 | Kubota et al. | 358/341 |

*Primary Examiner*—Thai Tran
*Attorney, Agent, or Firm*—Pillsbury Madison & Sutro LLP

[57] ABSTRACT

Information about the correspondence relation between image data and sound data is recorded together with auxiliary information about the image data or the sound data in a control file, in which the auxiliary information is to be recorded.

4 Claims, 13 Drawing Sheets

ROTATION OF PLAYED-BACK
IMAGE BY HOLDING >(+) SWITCH
DEPRESSED

LCD DISPLAY IN THE
CASE OF FIG.3

PLAY-BACK
WHEN SW.13E AND SW.13F ARE INSTRUCTING "PLAY" AND "SOUND" RESPECTIVELY,
PLAY-BACK IS EXECUTED AT EACH SOUND FILE

SOUND FILE 1

PLAY-BACK
WHEN SW.13E AND SW.13K ARE INSTRUCTING "PLAY" AND "PROGRAM" RESPECTIVELY,
PLAY-BACK IS EXECUTED ACCORDING TO PROGRAM IN THE CONTROL FILE

```
INFO
  PROGRAM1
    TIME5
      1. DSC00001.J6I - DSC00001.J6S - DSC00001.J6T
      2. DSC00002.J6I - DSC00002.J6S - DSC00002.J6T
      3. DSC00003.J6I - DSC00003.J6S - DSC00003.J6T
END
```

| IMAGE 1 | IMAGE 2 | IMAGE 3 |
| SOUND FILE 1 | SOUND FILE 2 | SOUND FILE 3 |
| TEXT 1 | TEXT 2 | TEXT 3 |
| "Hello" IS DISPLAYED | "This is sample" IS DISPLAYED | "END" IS DISPLAYED |

```
INFO
    PROGRAM1
        TIME5
        1.DSC00001-DSC0001 -DSC0001
        2.DSC00002-           -DSC0002
        3.DSC00003-DSC00003-DSC00003
    END
              ↑         ↑         ↑
             #1        #2        #3
```

ELECTRONIC IMAGING APPARATUS

This is a continuation of application Ser. No. 08/249,031, filed on May 25, 1994, which was abandoned upon the filing hereof.

BACKGROUND OF THE INVENTION

The present invention relates to an electronic imaging apparatus and, more particularly, to an electronic imaging apparatus for image recording or image processing with improved operation control and application properties.

Among prior art electronic imaging apparatuses for recording or processing image information in a recording media, an apparatus has been proposed in which sound data corresponding to image information is also recorded. FIG. 17 shows a construction example of a prior art electronic imaging apparatus of this type, as an electronic still camera or still picture camera.

As shown in FIG. 17, lens 1 focuses a subject image on CCD 2 as an image sensor for conversion to an electric image signal. The image signal is processed in image signal processor 3 and then converted in A/D converter 4 to digital image data for recording in frame memory 5. The image data from A/D converter 4 is also converted in D/A converter 14 into an analog signal, which is supplied to video output terminal 16 and to EVF (Electronic View Finder) 15 for display on a monitor.

Write and read control of frame memory 5 are performed by frame memory controller 6. Image data read out from frame memory 5 is compressed in image data compressing/decompressing circuit 7 and then recorded on recording medium 10 via interface 9. A system controller 8 controls the overall apparatus in response to instruction signals from operation switches 13A to 13J via operation switch section 12. A display unit (LCD) 11 displays the prevailing operating state.

In an image play-back mode, the image information is played-back through a reverse process. More specifically, the image data read out from recording medium 10 is supplied through interface 9 to image data compressing/decompressing circuit 7, for decompression before being recorded in frame memory 5. Image data that is read out from frame memory 5 is converted in D/A converter 14 into an analog signal, which is played-back on a monitor via EVF 15 or video output terminal 16.

When recording sound signal, a sound from microphone 21 or external line input terminal 22 is pre-processed in sound pre-processor 20 to a predetermined pre-processing and then converted in A/D converter 19 to digital sound data before being recorded in sound memory 18. The sound data is then coded in a sound coder/decoder 17 prior to being recorded on recording medium 10 via interface 9.

In sound play-back, sound data read out from recording medium 10 via interface 9 is decoded in sound coder/decoder 17, converted in D/A converter 23 into an analog signal, and then subjected in sound post-processor 24 to a predetermined sound processing before being supplied to sound output terminal 25 or to loudspeaker 26.

Various well-known camera operation instruction switches are connected to an operation switch section 12. These switches are trigger 1 switch 13A, trigger 2 switch 13B, minus (<) switch 13C, plus (>) switch 13D, recording/play-back (REC/PLAY) switch 13E, picture/sound (PICT/SOUND) switch 13F, play-back mode switch 13G, normal mode switch 13H, high speed continuous recording switch 13I, and low speed continuous recording switch 13J. In either continuous recording mode, the repetition of shooting is done at an interval.

In the above construction, heretofore an exclusive operation switch has been provided for recording sound information corresponding to image information, and the switch has been operated for recording and reproduction of sound information.

Since in the prior art electronic imaging apparatus a separately provided exclusive switch is operated for recording and reproduction of sound information, not only is the operation complicated, but the construction of the apparatus is also complicated.

SUMMARY OF THE INVENTION

An object of the present invention is therefore to provide an electronic imaging apparatus with improved operation control and application properties.

According to the present invention, information about the correspondence relation between image data and sound data is recorded together with auxiliary information about the image data or the sound data in a control file, in which the auxiliary information is to be recorded.

According to one aspect of the present invention, there is provided an electronic imaging apparatus comprising: reproducing means for selectively reproducing image data or sound data having been recorded previously in a file form, first recording means for recording sound data or image data in a file format with a correspondence relation to the image data or sound data selected by being reproduced by the reproducing means, and second recording means for collectively recording information about the correspondence relation in a control file which is used to record auxiliary information data about the image data or the sound data recorded by the first recording means in a file format.

According to another aspect of the present invention, there is provided an image recording apparatus comprising: reproducing means for sequentially reproducing data from data file areas which store image data or sound data (on the basis of user's operations and inclusive of automatic sequential reproduction), the capability of reproducing operation including a case of a reproducing operation with respect to a file area without any stored data so that a blue-back picture results from the reproduction, first recording means for activating, in response to a first operation command (trigger 1 for actuating each of sound files 1, 2, . . . in a programmed after-recording sequence), an operation of recording sound data or image data in a file format with a correspondence relation to the image data or sound data reproduced by the reproducing means, in response to a second operation command (trigger 1 for stopping each of the sound files 1, 2, . . . in the programmed after-recording sequence), an operation sequence of repeating a unit operation to stop the recording operation, and in response to a third operation command (trigger 2 for commanding escaping from the programmed after-recording sequence) escaping from the sequence, second recording means for collectively recording data representing the correspondence relation in a control file which is used to record in a file format auxiliary information data about the image data or the sound data recorded by the first recording means, and operation command generating means including an operation section with a plurality of operation stages corresponding to a plurality of stages of operation (activated by a pertinent image recording function section), the operation command generating means generating the first and/or second operation commands for the first recording means in response to one of the operation stages in the operation section and generating the third operation command in response to another operation stages in the operation section. the first and second operation commands being generated circulatedly by a trigger first stage operation, the third operation command (i.e., command for escaping from the sequence) being generated by a trigger second stage operation, similar function status being included in an electronic imaging apparatus, in which image to be recorded is frozen in a trigger first stage so that the frozen picture is recorded on a medium in a trigger second stage.

According to another aspect of the present invention, there is provided an image recording apparatus comprising: reproducing means for selectively reproducing image data or sound data having been recorded previously in a file format, recording means for recording sound data or image data in a file format on a pertinent recording medium with a correspondence relation to the image data or sound data selected by being reproduced by the reproducing means, and alarming means for recognizing a recording capacity of the recording medium and, if the recognized recording capacity fails to meet a condition required for the recording at that moment, producing a sound alarm.

According to other aspect of the present invention, there is provided an electronic imaging apparatus comprising: A/D converter means commonly used for analog image signal and analog sound signal for conversing the analog signals into digital data, first switching means for switchingly outputting the image signal or the sound signal supplied to the A/D converter means, recording means for recording digital data of image information or sound information corresponding to the output of the A/D converter means as separate files on the recording medium, and second switching means for switchingly supplying the digital data of the image information or sound information of the A/D converter means as separate files.

According to a further aspect of the present invention, there is provided an electronic imaging apparatus comprising: first recording means for recording image data corresponding to image information as an image file, second recording means for recording sound data supplied separately from the image data as a sound file, communication interface means for transmitting data read out from the sound file through a pertinent transmission line, and control means operative, when a pertinent sound data supply means is connected via the communication interface means, for controlling the transmission and/or reception of sound data with respect to the sound data supply means in a predetermined status.

According to still further aspect of the present invention, there is provided a sound data supply apparatus comprising: sound data output means for outputting sound data, capable of being supplied in a predetermined status (generating including generating by reproduction of recorded data), communication interface means for transmitting sound data outputted from the sound data output means through a pertinent transmission line, and control means operative, when a pertinent image processing apparatus is connected via the communication interface means, for executing an operation of transmitting and/or receiving the sound data in a status instructed by a command from the image processing apparatus.

DETAILED DESCRIPTION OF THE PREFERRED EMBODIMENTS

Preferred embodiments of the present invention will now be described with reference to the drawings.

Figure 1:
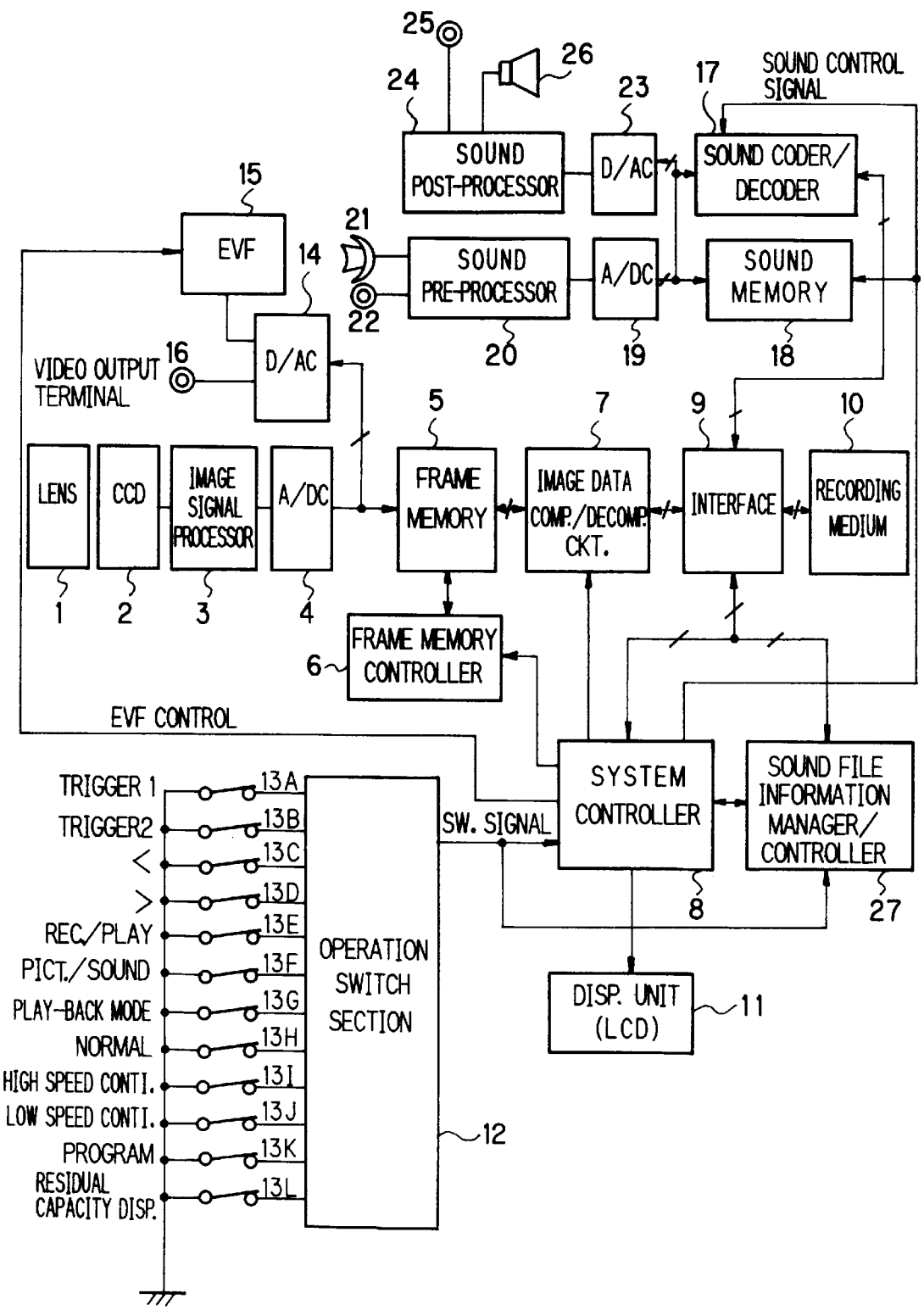
FIG. 1 shows a block diagram of the electronic imaging apparatus according to one embodiment of the present invention.

FIG. 1 is a block diagram showing one embodiment of the electronic imaging apparatus according to the present invention. In FIG. 1, reference numerals and symbols like those in FIG. 17 designate components having like functions. This embodiment further comprises program switch 13K for designating a program operation at the time of recording or play-back and sound file information manager/controller 27 for managing and controlling sound file information to be recorded according to switch information received via operation switch section 12. The sound file information manager/controller 27 may be stored in a ROM as a program in system controller 8, although it may be provided separately as in this embodiment. This embodiment also provides switch 13L for displaying residual recording capacity.

Figure 2:
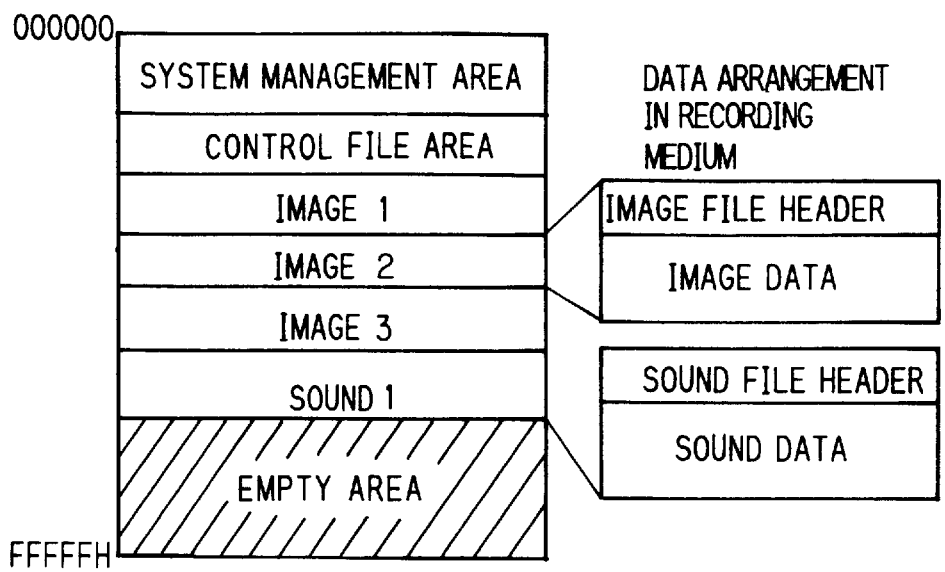
FIG. 2 shows an example of data arrangement on a recording medium.

FIG. 2 shows an example of data arrangement on a recording medium, on which image information, sound information, control information, etc. are stored. As shown in FIG. 2, the storage area in the recording medium comprises a system management area, a control file area, an area of image 1, an area of image 2, an area of image 3, an area of sound 1, and an empty area. The image area comprises an image file header area and image data area. The sound area comprises a sound file header area and sound data area.

Figure 3:
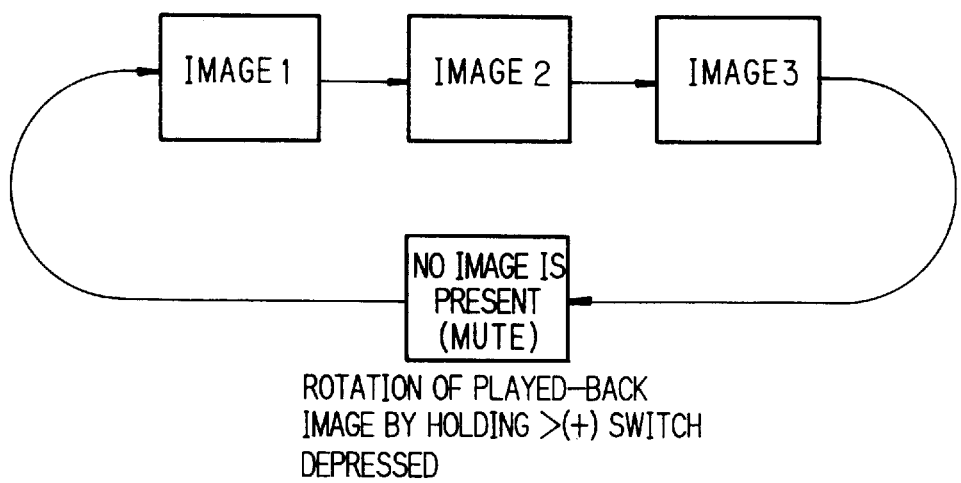
FIG. 3 shows monitor displays in the play-back mode.
Figure 4:
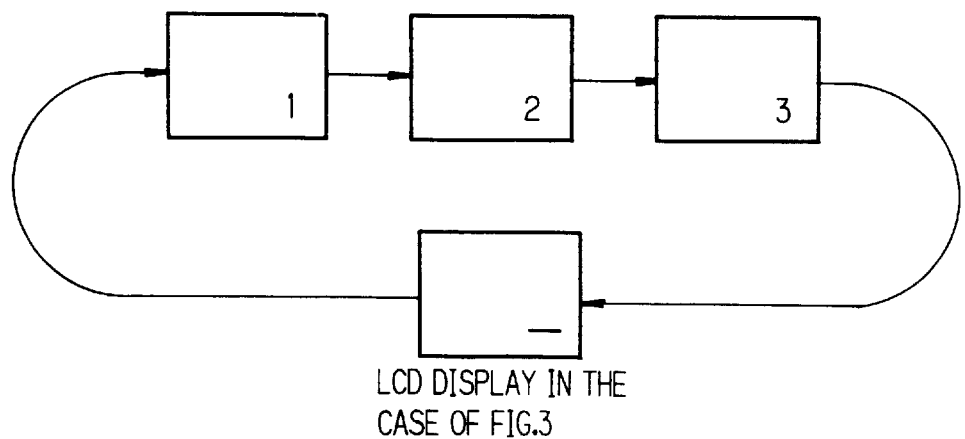
FIG. 4 shows the display on LCD 11 in FIG. 3.

In the play-back mode, by holding switch 13D depressed, images are played-back on the monitor in a rotation manner as shown in FIG. 3. Specifically, images 1 to 3 are displayed in succession in the numbered order. If no image is present, mute images are played-back. FIG. 4 shows the display on LCD 11 in this case.

Figure 5A:
FIGS. 5A to 5C show recording operation of the electronic imaging apparatus shown FIG. 1.
Figure 5B:
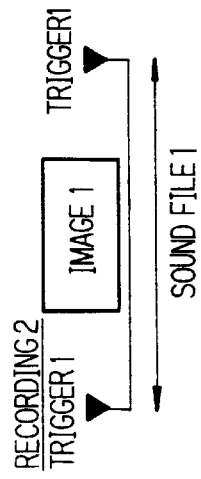
Figure 5C:
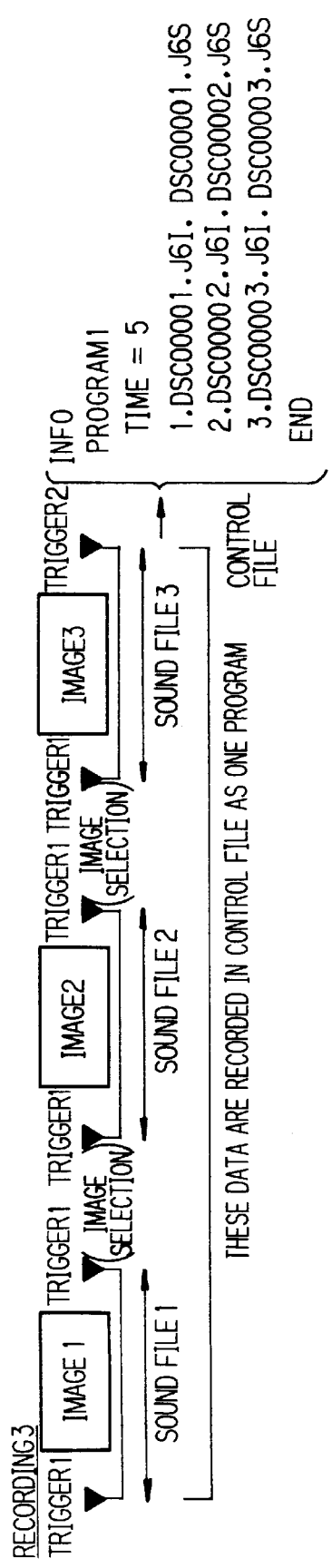

The recording operation in this embodiment will now be described specifically with reference to FIG. 5. In the case of recording sound file management data, such as sound recording time length, date, etc., in the sound file header with respect to a mute image as shown in FIG. 5A, the recording of the sound file is started by depressing trigger 1 switch 13A and ended by depressing trigger 1 switch 13A once again (recording 1). In a period defined as the time lapse from the previous depression to the succeeding depression of trigger switch 13A, the sound signal from microphone 21 or external line input terminal 22 is converted to sound data of an appropriate format for the sound file. Shown in FIG. 5B is the case, in which image 1 is played-back. In this case, in addition to the case 5A, the file name of image 1 is recorded as a corresponding image in the sound file header, or the file name of image 1 is recorded as a corresponding image in the image 1 file header (recording 2). In the case shown in FIG. 5C, the sound file recording is started by the depression of trigger 1 switch 13A and ended by the depression of the trigger 1 switch 13A once again. By repeating the depression of trigger 1 switch 13A, the sound files corresponding to the respective selected and played-back images 1 to 3 are recorded (recording 3). The image selection is done by operating minus (<) and plus (>) switches 13C and 13D. When program switch 13K is depressed, the end of the recording sequence is brought about by operating trigger 2 switch 13B. The above recording sequence is recorded as a program in a control file. An example of a control file is shown in FIG. 5C. The above operations are executed by sound file information manager/controller 27.

Figure 6A:
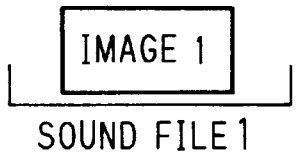
FIGS. 6A and 6B show drawings for explaining the play-back operation.
Figure 6B:

When switches 13E and 13F are instructing "PLAY" and "SOUND", respectively, system controller 8 reads out the corresponding image file name in the sound file header. Thus, as shown in FIG. 6A, sound file 1 corresponding to image 1 is played-back (that is, record in FIG. 5B is played-back). When switches 13E and 13K are instructing "PLAY" and "PROGRAM", respectively, the play-back is executed according to the program in the control file as shown in FIG. 6B (that is, record in FIG. 5C is played-back). If there is no corresponding image file name in the sound file header in this case, the sole sound file is played-back (that is, record in FIG. 5A is played-back). As shown above, in the program recording mode, trigger 1 switch 13A is made to correspond to the start and end of each sound file, and trigger 2 switch 13B is made to correspond to the end of the sequence.

In this embodiment, a mode of playing-back both sound and image files simultaneously and continuously, can be set by a simple operation. In addition, since the play-back sequence is in the form of a file, subsequent re-editing can be readily realized. Further, a single operation section can generate different instructions, thus permitting simplification of the construction. Furthermore, the sequence of repeating the corresponding recording of image and sound and the operation for escaping from this sequence are not complicated. Thus, it is possible to obtain satisfactory operation control properties and extremely reduce the possibility of erroneous operations.

Figures 7, 8:
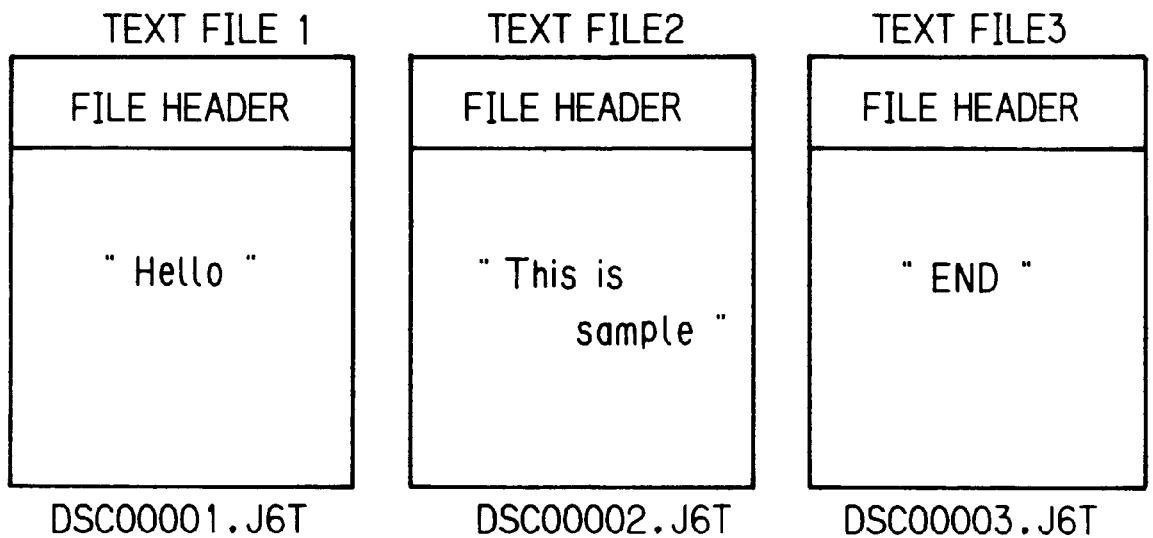
FIG. 7 shows examples of text files in the embodiment.
FIG. 8 shows examples of amended control file in the embodiment.

In the embodiment, correspondence relation to the sound data, the image data, or the text file, and/or the order of the reproduction are/is recorded as a file, simplifying the processing of the determination of the reproduction order. On the contrary, in the prior art system, since the reproduction order is determined by searching the headers of all files, it requires relatively large time and file construction is complex. As shown in FIG. 7, text files 1 to 3 may be made for the image 1 and sound file 1, the image 2 and sound file 2, and the image 3 and sound file 3, shown in FIG. 5, to amend the control file by the personal computer. Thus amended control files are shown in FIG. 8. As shown in FIG. 8, the third column data are added to the existing data shown in FIG. 5C.

Figures 9, 10:
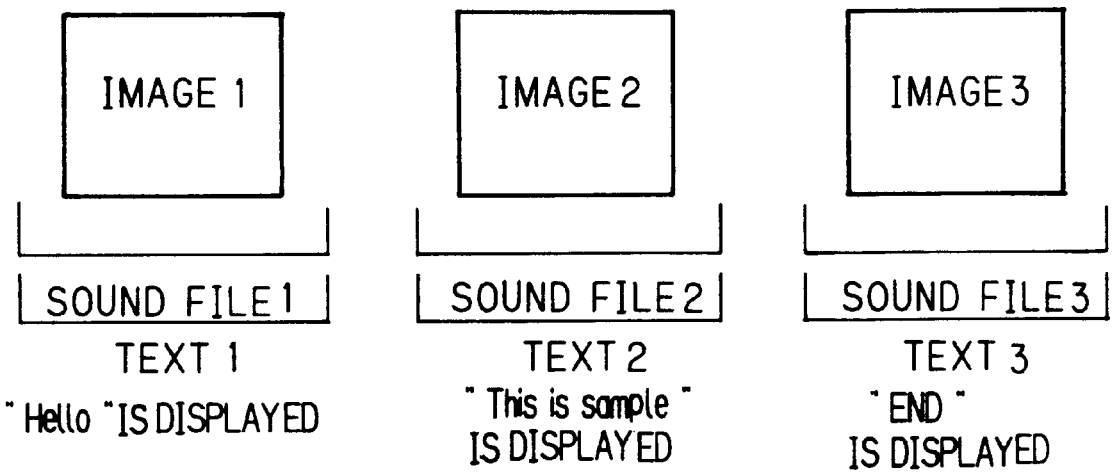
FIG. 9 shows examples of program reproduction result in the embodiment.
FIG. 10 shows examples of control file without use of expander.

The program reproduction result of the image, sound and text files, on a display such as LCD 11, are shown in FIG. 9. In this process, system controller 8 reads out the text file "Hello" after reproducing image 1 and recording its data in frame memory 5 through the control of frame memory controller 3, thereby displaying the text and reproducing the sound file.

In a further embodiment, the file name is represented in the control file without use of an expander for reading out the file size of the control file. For example, the control files may be represented as shown in FIG. 10. In FIG. 10, the image file, the sound file and the text file are recorded in predetermined columns such as #1, #2, and #3, respectively. If there is no sound file, no file is recorded in the corresponding column in the control file as shown in FIG. 10. According to this embodiment, since no search process about the image, sound and text files is necessary, the system operation speed is much increased.

In another embodiment, residual capacity display switch 13L is provided. When switch 13L is operated, the recording medium is searched, and the residual recording capacity thereof, such as residual image frames or time capable of recording, is displayed on a monitor, such as LCD 11 or EVF 15, or the residual recording capacity information is issued as sound from loudspeaker 26 under control of system controller 8. Further, when residual recording capacity shortage is brought about, a n alarm may be issued. The display on the monitor can be done by fade out or numerical value. More specifically, as for the image, the number of residual image frames capable of recording is displayed on the LCD. As for the sound, system controller 8 (or sound file information manager/controller 27) calculates the residual time from the empty area in the recording medium, the calculated residual time is supplied through interface 9 to sound coder/decoder 17, and the decoded sound data is supplied to loudspeaker 26 through D/A converter 23 and sound post-processor 24.

Figure 17:
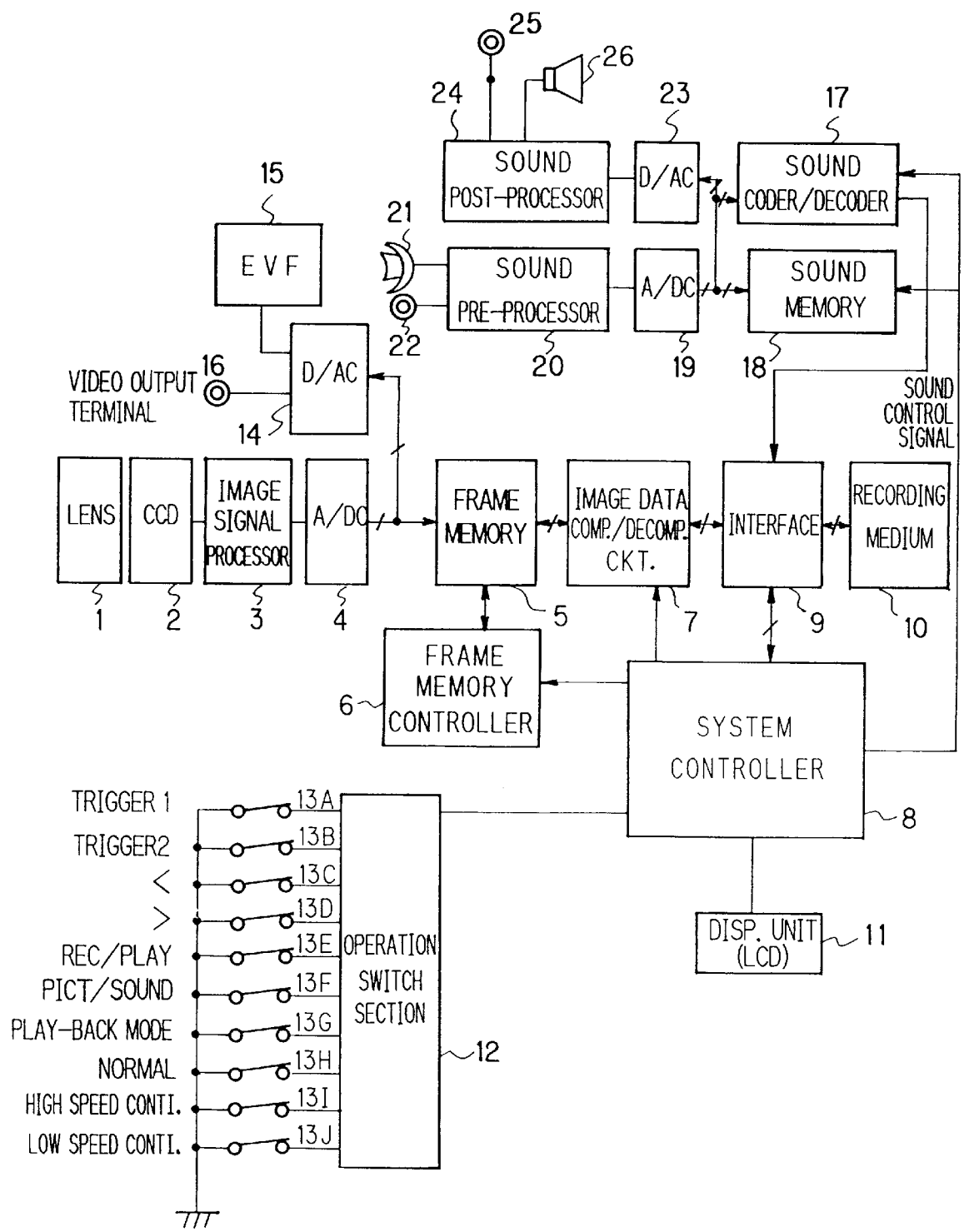
FIG. 17 shows an example of a prior art electronic imaging apparatus.

A next embodiment of the present invention will now be described. which permits simplification of the hardware structure of the prior art electronic imaging apparatus shown in FIG. 17 and described above. In the prior art electronic imaging apparatus shown in FIG. 17, the image and sound processing systems require respective A/D converters 4 and 19 and D/A converters 14 and 23, thus posing the problem of cost and an obstacle to increased mounting density.

In this embodiment, a single A/D converter and a single D/A converter are used commonly in both the image and sound processing systems, thus permitting structure simplification.

Figure 11:
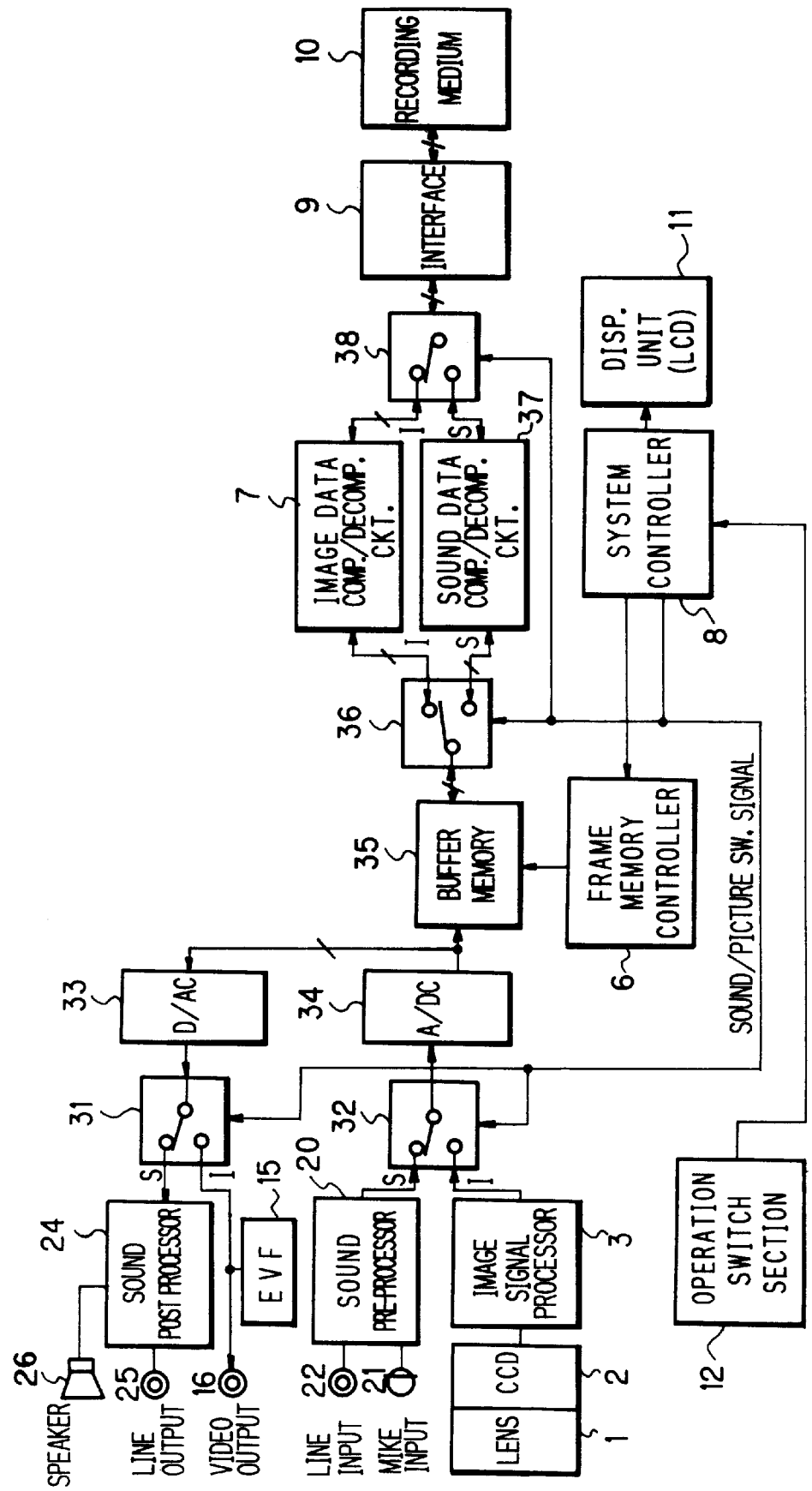
FIG. 11 shows a block diagram of the electronic imaging apparatus according to another embodiment.

FIG. 11 i s a block diagram showing this embodiment of the electronic imaging apparatus. In FIG. 11, reference numerals and symbols like those in FIG. 1 designate components having like functions.

As shown in FIG. 11, this embodiment has switches 31, 32, 36, 38, buffer memory 35 and sound data compressing/decompressing circuit 37. The switch 32 switches inputs to A/D converter 34. The switch 31 switches the output from D/A converter 33. The switch 36 switches the connection of image data compressing/decompressing circuit 7 and the connection of sound data compressing/decompressing circuit 37 to buffer memory 35. The switch 38 switches the connection of image data compressing/decompressing circuit 7 and that of sound data compressing/decompressing circuit 37 to interface 9. The switching operations of these switches are controlled by a "PICT./SOUND" mode selection signal (image/sound switch signal) that is received through operation switch section 12. In the sound mode, each switch selects the sound processing line (S terminal as shown). In the picture mode, each switch selects the image processing line (I terminal as shown).

Figure 12:
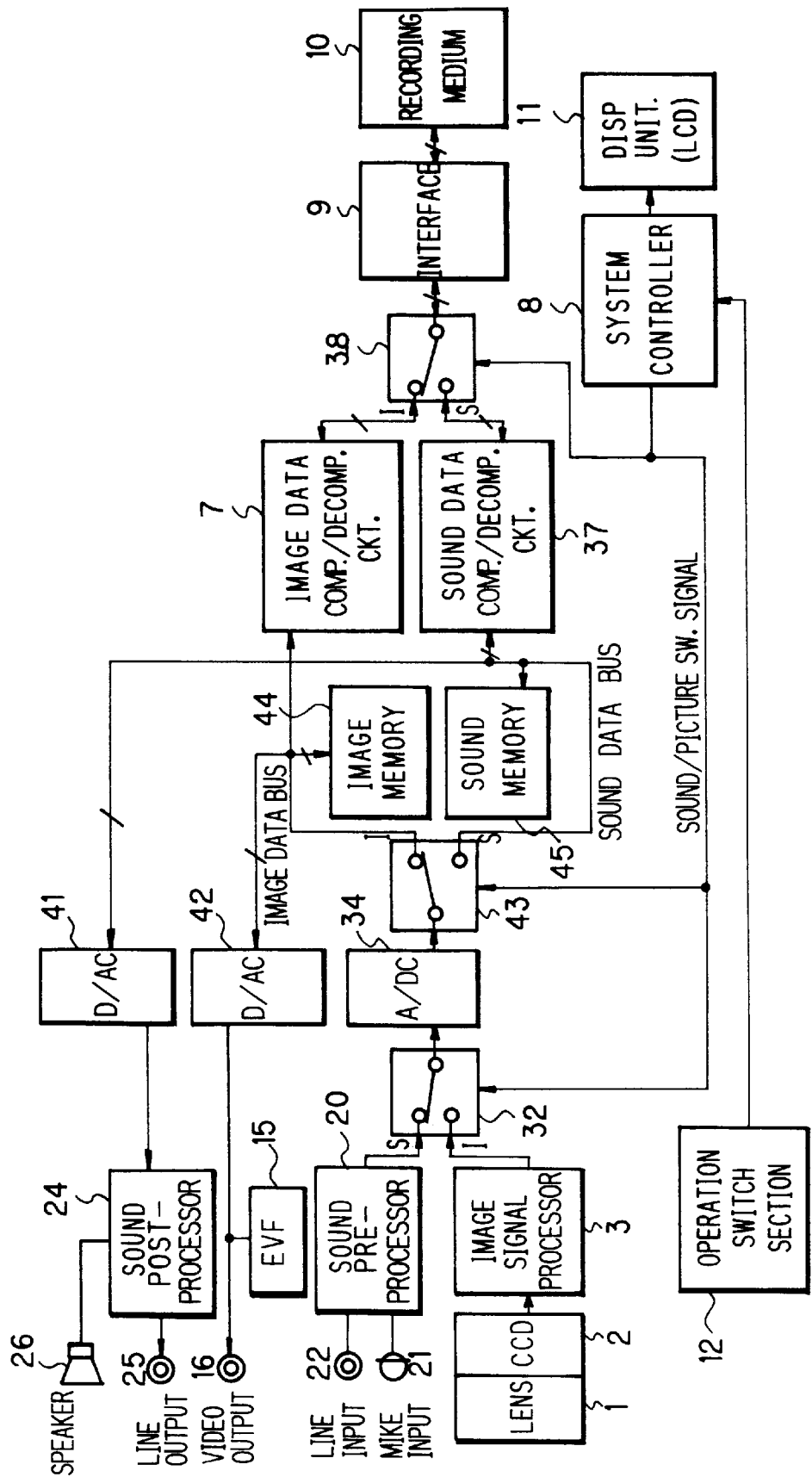
FIG. 12 shows a block diagram of the electronic imaging apparatus according to further embodiment.

FIG. 12 shows a further embodiment of the present invention. This embodiment is an improvement of the preceding embodiment shown in FIG. 11, and it permits simultaneous play-back of image and sound information.

In this embodiment, image memory 44 and sound memory 45 are provided separately, and the image data and sound data provided through switch 32 and A/D converter 34 are recorded in the corresponding memories through switch 43. The sound and image processing lines include respective D/A converters 41 and 42 for converting data read out from sound and image memories 45 and 44 into analog signals.

For example, image data read out from recording medium 10 is supplied through switch 38 to image data compressing/decompressing circuit 7 for decompression processing before being recorded in image memory 44. In the similar manner, sound data read out from recording medium 10 is decompressed in sound data compressing/decompressing circuit 37 before being recorded in sound memory 45. The image and sound data read out respectively from image and sound memories 44 and 45 are converted in D/A converters 42 and 41 into analog signals to obtain simultaneous play-back outputs.

A further embodiment of the present invention will now be described. This embodiment permits use of an exclusive image recording and reproducing apparatus for sound recording and reproduction as well with a simple construction. Heretofore, there has been no means for permitting the sound recording and reproduction with an existing exclusive image recording and reproducing apparatus. Therefore, it has been required for the manufacturer to add a sound processing circuit to the apparatus by a design change, and it has been required for the user to purchase such apparatus corresponding to the sound processor, thus leading to a higher cost.

This embodiment can solve this problem, and specifically it utilizes an electronic imaging apparatus provided with universal communication control means such as "RS232C" (i.e., software stored in ROM) so as to be capable of control by a personal computer or the like.

Figure 13:
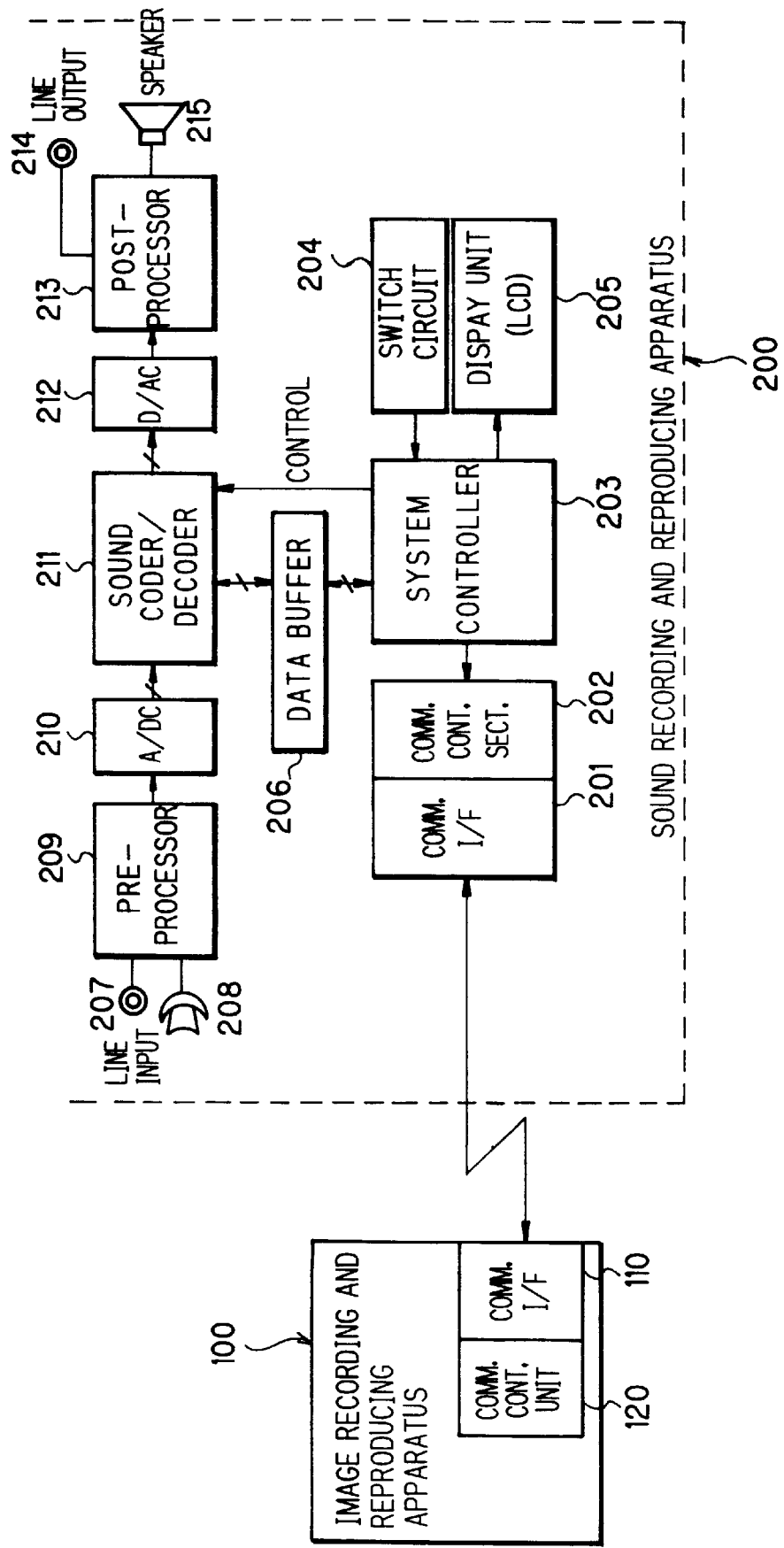
FIG. 13 shows a block diagram of the image recording and reproducing apparatus, and the sound recording and reproducing apparatus.

FIG. 13 is a block diagram showing this embodiment. The embodiment comprises image recording and reproducing apparatus 100, which includes communication control unit 120 and communication interface (I/F) 110, and sound recording and reproducing apparatus 200, which includes communication control unit 202 and communication interface 201, apparatuses 100 and 200 being connected to each other by a wired line or a radiowave line.

In sound recording and reproducing apparatus 200, system controller 203 controls the overall apparatus according to operation instruction signals received through switch circuit 204. The operating state is displayed on display unit 205, such as an LCD. Sound data from line input terminal 207 or microphone 208 is subjected in pre-processor 209 to a predetermined pre-processing, then converted in A/D converter 210 into digital data, and then coded in sound coder/decoder 211. The coded sound data is stored in data buffer 206, and it is supplied through D/A converter 212 and post-processor 213 to loudspeaker 215 or line output terminal 214.

In play-back, data is read out from data buffer 206, then decoded in sound coder/decoder 211 and then converted in D/A converter 212 into an analog signal. This signal is subjected in post-processor 213 to a predetermined post-processing before being output to line output terminal 214 or to loudspeaker 215.

Figure 14:
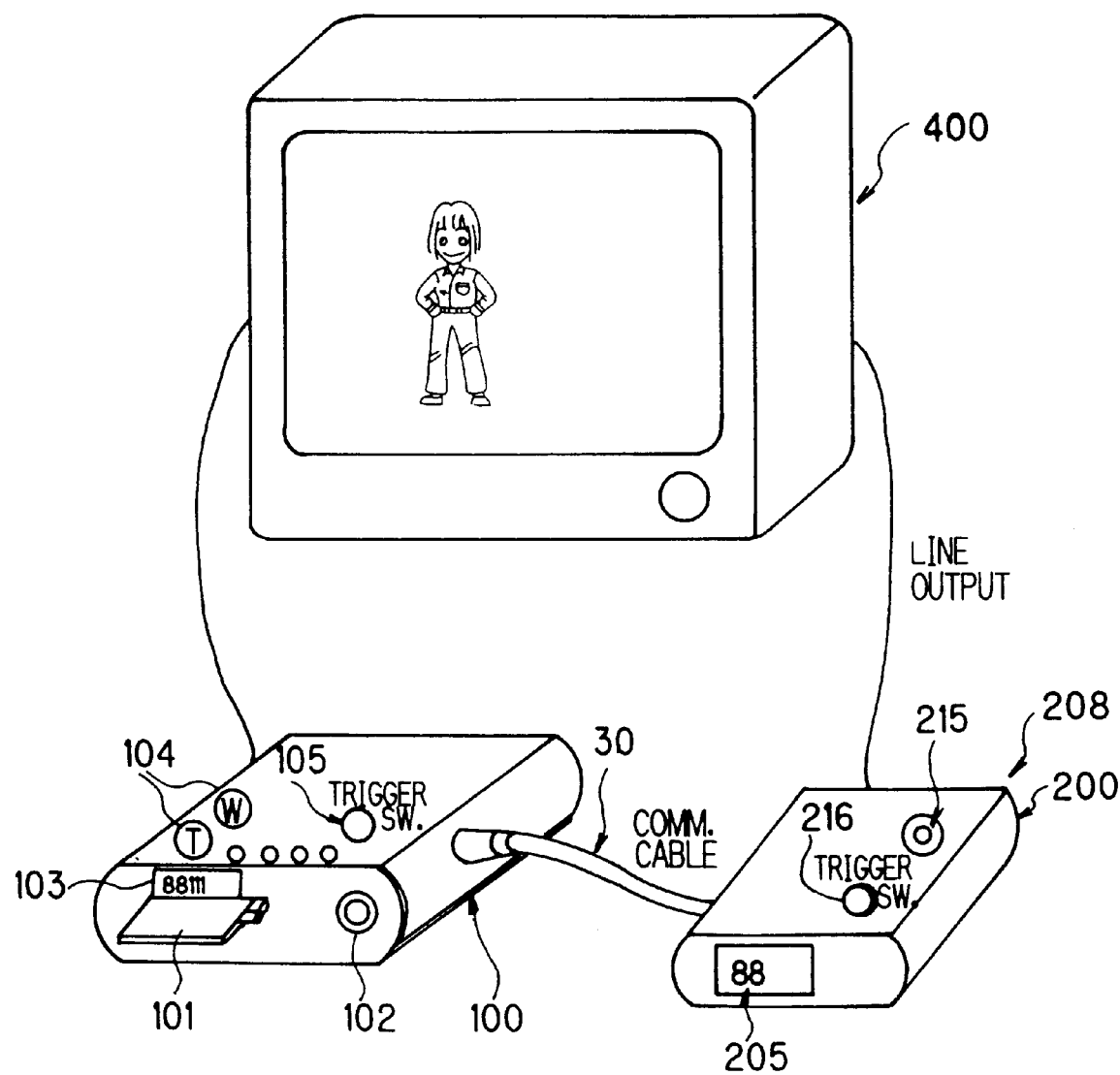
FIG. 14 shows a specific arrangement of the embodiment.

FIG. 14 shows a specific arrangement of this embodiment.

The image and sound recording and reproducing apparatuses 100 and 200 have their respective communication interfaces connected to each other by communication cable 300. An image signal from image recording and reproducing apparatus 100 and a sound signal from bound recording and reproducing apparatus 200 are supplied to monitor 400 for image display and sound output.

In this embodiment, image recording and reproducing apparatus 100 is a camera including recording medium 101 such as an IC memory card, view finder 102, LCD display unit 103, zoom switch 104, trigger switch 105, etc. The sound recording and reproducing apparatus 200 includes display unit (LCD) 205, microphone 208, loudspeaker 215, trigger switch 216, etc.

Figure 15:
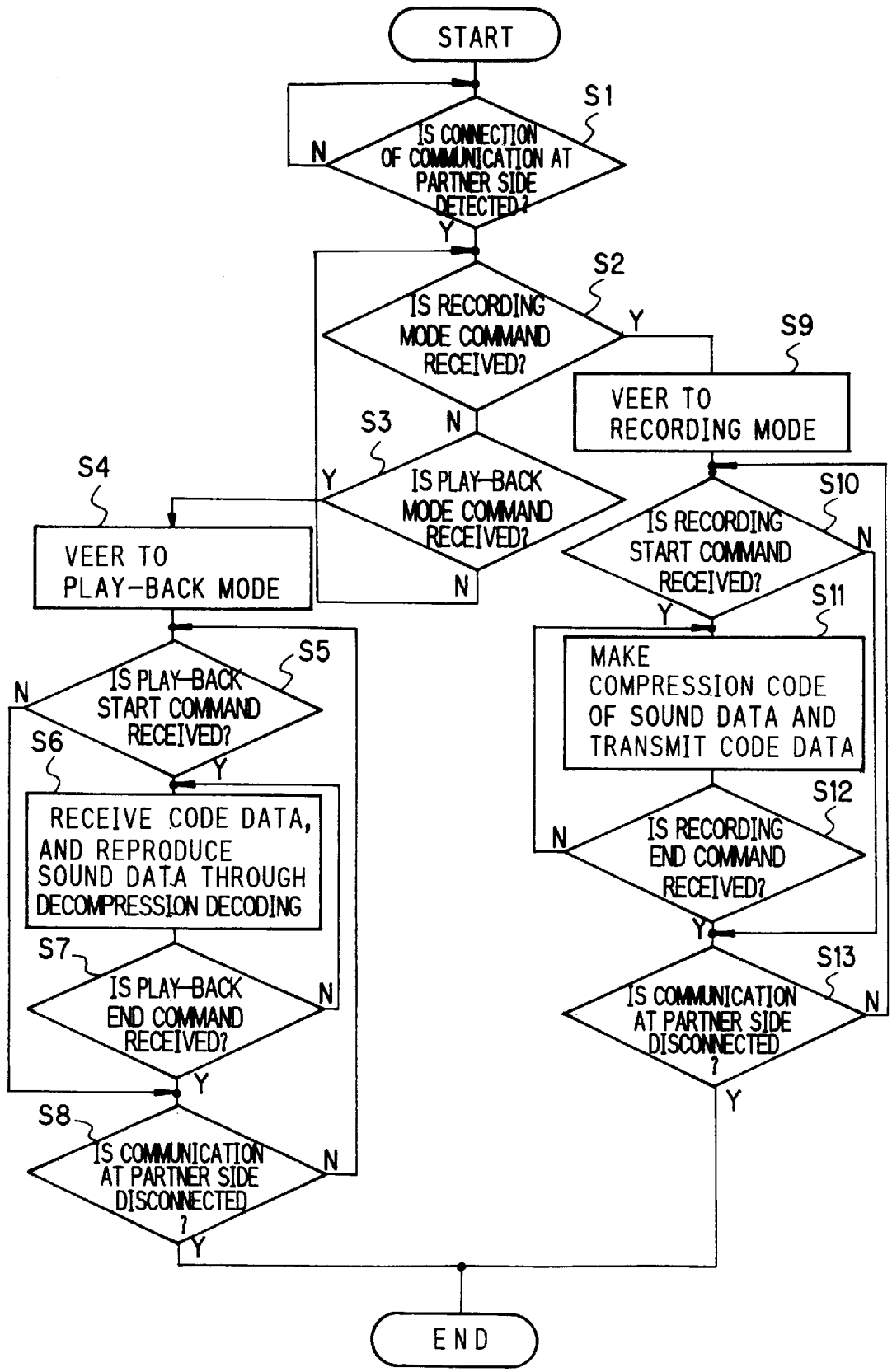
FIG. 15 shows a flowchart of an operation of the sound recording and reproducing apparatus 200.

The operation of sound recording and reproducing apparatus 200 in this embodiment will now be described with reference to the flow chart of FIG. 15.

First, communication cable 300 is connected, and when the connection of the communication at partner side (i.e., image recording and reproducing apparatus 100) is detected (step S1), whether a recording mode command has been received is checked (step S2). If the recording mode command has not been received, a check is done as to whether a play-back mode command has been received (step S3). If not, the routine goes back to step S2. If the command has been received, the routine goes to the play-back mode (step S4). Then, whether a play-back start command has been received is checked (step S5). If received, code data is received, and sound data is reproduced through decompression decoding (step S6). Then, a check is done as to whether a play-back end command has been received (step S7). If it is found in step S7 that the play-back end command has not been received, the routine goes to step S6. If the command has been received, a check is done as to whether the communication at partner side has been disconnected (i.e., whether the communication cable has been disconnected) (step S8). If not disconnected, the routine goes back to step S5. if it is found in step S5 that the play-back start command has not been received, the routine goes to step S8. If it is found in step S8 that the communication at partner side has been disconnected, an end is brought to the routine.

If it is found in step S2 that the recording mode command has been received, the routine goes to the recording mode (step S9), and then whether the recording start command has been received is checked (step S10). If the recording start command has not been received, the routine goes to step S13. If received, sound data is compression coded, and the code data is transmitted (step S11). Then, a check is done as to whether a recording end command has been received (step p12). If not received, the routine goes back to step S11. If received, a check is done as to whether the communication at partner side has been disconnected (step S13). If the communication at partner side has not been disconnected, the routine goes back to step S10. If disconnected, an end is brought to the routine.

Figure 16:
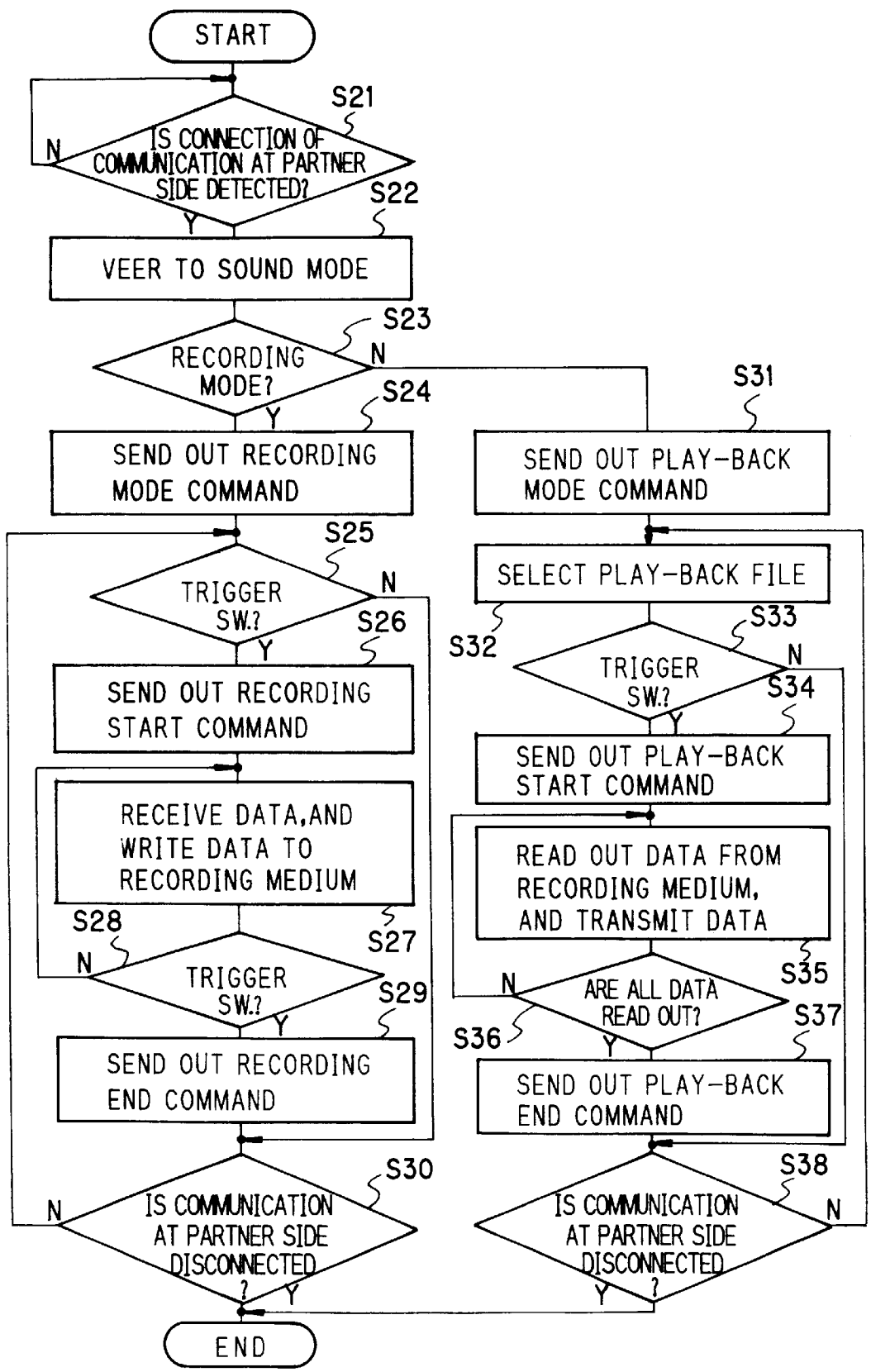
FIG. 16 shows a flowchart of an operation of the image recording and reproducing apparatus 100.

Now, the operation of image recording and reproducing apparatus 100 will be described with reference to the flow chart of FIG. 16.

When the connection of the communication at partner side is detected (step S21), the routine goes to the sound mode (step S22), and a check is done as to whether the recording mode prevails (step S23). If the recording mode prevails, a recording mode command is sent out (step S24), and whether a trigger switch has been operated is checked (step S25). If the trigger switch has been operated, a recording start command is sent out (step S26). If it is found in step S25 that the trigger switch has not been operated, the routine goes to step S30. Then, data is received and written in the recording medium (step S27). Then, whether the trigger switch has been operated again (depressed again) is checked (step S28). If not operated again, the routine goes back to step S27. If operated again, a recording end command is sent out (step S29), and a check is done as to whether the communication at the partner side has been disconnected (step S30). If the communication at the partner side has not been disconnected, the routine goes back to step S25. If disconnected, an end is brought to the routine.

If it is found in step S23 that the recording (REC) mode does not prevail, a play-back mode command is sent out (step S31), then the play-back file is selected (step S32), and then whether the trigger switch has been operated (i.e., depressed) is checked (step S33). If the trigger switch has been operated, a play-back start command is sent out (step S34). Then, data is read out from the recording medium and transmitted (step S35). A check is then done as to whether all data has been read out (step S36). If all data has not been read out, the routine goes back to the step S35. If read out, a play-back end command is sent out (step S37), and a check is done as to whether the communication at the partner side has been disconnected (step S38). If not disconnected, the routine goes back to the step S32. If disconnected, an end is brought to the routine. If it is found in step S33 that the trigger switch has not been operated, the routine goes to step S38.

This embodiment permits an image/sound recording and reproducing apparatus to be constructed by merely requesting a ROM change of an exclusive image recording and reproducing apparatus at hand and purchasing a sound recording and reproducing apparatus.

As has been described in the foregoing, in the electronic imaging apparatus according to the present invention information about the correspondence relation between image data and sound data is recorded together with auxiliary information about the image data or sound data in a control file, in which the auxiliary information is to be recorded. Thus, it is possible to improve the properties of handling image data and sound data and also the operation control properties.

What is claimed is:

1. An electronic still camera being capable of recording image data and sound data in an applied recording media in a digital form via a digital signal processing circuit, the camera comprising:

a system controller provided in the electronic still camera for administrating an overall control of the camera;

a sound file information manager/controller for managing and controlling sound file information to be recorded according to received switch information;

a first trigger switch for commencing and ending a sound data recording operation in response to repetitive depressive action thereto via cooperative operation of the sound file information manager/controller, the sound data recording operation being repetitively performed for successive sound data, each corresponding to a selected image data respectively, thereby providing a sequential order of image data and sound data to be subjected to an operation;

a program switch for defining a program corresponding to the sequential order provided by the repetitive depressive action to the first trigger switch, in response to and action thereto via a cooperative operation of said sound file information manager/controller; and a second trigger switch for defining a termination of a string of the program in response to depressive action thereto via cooperative operation of the sound file information manager/controller.

2. An electronic still camera in accordance with claim 1, wherein the program is once defined and subsequently stored in a control file which is previously defined for storing a subsidiary data concerning the camera.

3. An electronic still camera in accordance with claim 1, wherein the program switch provides an instruction for reproducing the recorded sound and/or image data conformably to the program stored in the control file when the camera operates in a play mode.

4. An electronic still camera in accordance with claim 1, further comprising:

an image selecting switch for selecting images corresponding to the sound data recorded in a predetermined file form.

* * * * *